United States Patent
Braford, Jr.

[11] Patent Number: 6,155,395
[45] Date of Patent: Dec. 5, 2000

[54] TRANSFER CASE HAVING PARALLEL CLUTCHES

[75] Inventor: Thomas E. Braford, Jr., Brighton, Mich.

[73] Assignee: BorgWarner Inc., Troy, Mich.

[21] Appl. No.: 09/293,703

[22] Filed: Apr. 16, 1999

[51] Int. Cl.[7] .................................................. F16D 47/00
[52] U.S. Cl. ...................... 192/48.3; 192/48.1; 192/48.4; 475/206; 180/249; 180/247
[58] Field of Search .................. 192/48.1, 48.3, 192/38, 48.4, 48.5, 105 BA; 180/247, 249; 475/206

[56] References Cited

U.S. PATENT DOCUMENTS

| | | | |
|---|---|---|---|
| 5,620,072 | 4/1997 | Engle | 192/35 |
| 6,033,334 | 3/2000 | Showalter | 475/206 |
| 6,062,361 | 5/2000 | Showalter | 192/38 |

Primary Examiner—Charles A. Marmor
Assistant Examiner—Tisha D. Waddell
Attorney, Agent, or Firm—Brinks, Hofer, Gilson & Lione; Greg Dziegielewski

[57] ABSTRACT

A transfer case includes a double overrunning or two-way clutch and torque limited centrifugal cone clutch disposed in mechanical parallel between a primary and secondary output of the transfer case. The double overrunning clutch includes a plurality of rollers disposed between concentrically arranged drive and driven members. The centrifugal cone clutch includes a preload or preset biasing spring which sets a minimal torque throughput, a plurality of weights which adjust the clutch force and thus torque throughput dependent upon the speed and stops which limit motion of the weights and thus determine the maximum clutch compressive force and torque throughput.

20 Claims, 6 Drawing Sheets

TRANSFER CASE HAVING PARALLEL CLUTCHES

BACKGROUND OF THE INVENTION

The invention relates generally to transfer case clutch configurations and more specifically to a transfer case having a double overrunning clutch and torque limited centrifugal clutch in mechanical parallel.

Motor vehicle four wheel drive systems have become increasingly sophisticated during the last decade. Such sophistication has been accompanied by improved understanding of vehicle dynamics and the more fundamental requirements of such systems. Better understanding of the fundamentals of vehicle dynamics has also encouraged a reexamination of less sophisticated mechanical systems.

For example, it was once proposed to provide four wheel drive from a primary, typically rear, drive line to a secondary or front drive line through a one-way or overrunning clutch which would engage and transfer torque from the rear drive line to the front drive line whenever the rear drive line attempted to overspeed the front drive line, typically because of a loss of traction of the rear drive wheels. However, due to the characteristics of one-way clutches, the system was incapable of providing four wheel drive in reverse. This deficiency was problematic in that the drive system would provide only two wheel drive when, for example, attempting to back out of deep snow or mud or while in reverse when attempting to rock the vehicle.

Also, at speed, a transfer case utilizing a one-way clutch could produce vehicle instability if the foot was lifted off of the throttle and the engine compression braking, which would slow only the rear wheels, created sufficient drag to break traction on these drive wheels.

It is known that the higher the engine speed, the more compression braking the engine creates in an off throttle condition. Since vehicle speed is proportional to engine speed, engine compression braking is also proportional to vehicle speed. The need for torque delivery to the front drive line to overcome the possible instability generating effects of engine braking at the rear wheels is also directly proportional of vehicle speed. Since the speed of the drive shafts of a vehicle also obviously varies with vehicle speed, a device which achieves cross drive line torque transfer, i.e., from the front drive line to the rear drive line in proportion to speed, will compensate for the effects of engine braking and improve vehicle performance and stability.

Another operating issue relating to both one-way and double overrunning clutches involves their rate of engagement. While they generally operate rapidly and such rapid operation is desirable, it would be preferable if the rate of engagement could be controlled. With standard mechanical overrunning clutches, this is not achievable. Accordingly, alternate approaches involving the combination of overrunning clutches with other torque transfer devices has been examined. The present invention is directed to such a device having parallel torque paths.

SUMMARY OF THE INVENTION

A transfer case includes a double overrunning or two-way clutch and torque limited centrifugal cone clutch disposed in mechanical parallel between a primary and secondary output of the transfer case. The double overrunning clutch includes a plurality of rollers disposed between concentrically arranged drive and driven members. The centrifugal cone clutch includes a preload or preset biasing spring which sets a minimal torque throughput, a plurality of weights which adjust the clutch force and thus torque throughput dependent upon the speed and stops which limit motion of the weights and thus determine the maximum clutch compressive force and torque throughput.

Thus is it an object of the present invention to provide a transfer case having a double overrunning clutch disposed in mechanical parallel with a torque limiting centrifugal clutch.

It is a further object of the present invention to provide a single speed motor vehicle transfer case having a double overrunning clutch disposed in mechanical parallel with a torque limiting centrifugal clutch.

It is a still further object of the present invention to provide a motor vehicle transfer case having only passive, mechanical components which control and proportion torque delivery between the primary and secondary drive lines of a motor vehicle.

It is a still further object of the present invention to provide a motor vehicle transfer case having a double overrunning clutch in parallel with a centrifugal clutch providing minimum and maximum torque transfer limits and torque transfer between these limits proportional to vehicle speed.

Further objects and advantages of the present invention will become apparent by reference to the following description of the preferred and alternate embodiment and appended drawings wherein like reference numbers refer to the same component, element or feature.

DESCRIPTION OF THE PREFERRED AND ALTERNATE EMBODIMENTS

Figure 1:
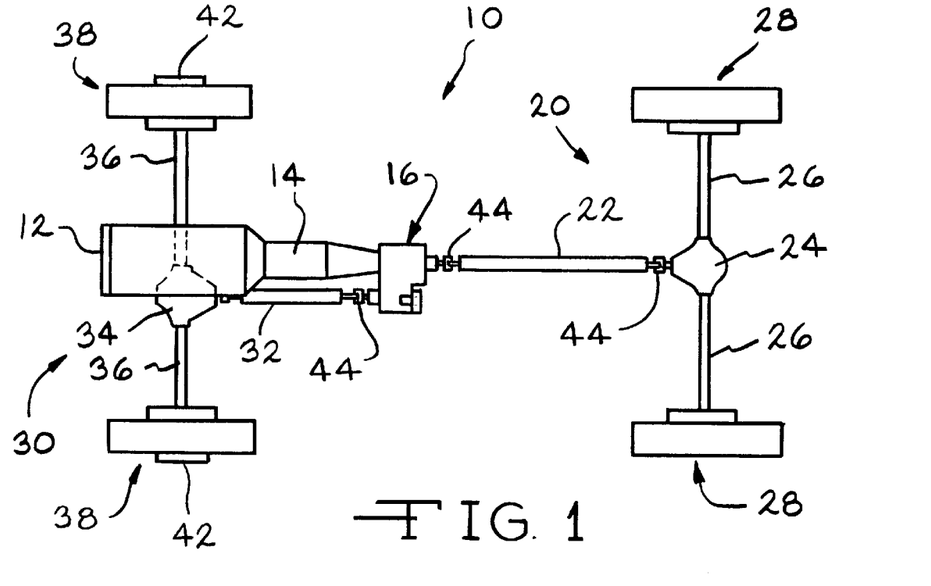
FIG. 1 is diagrammatic, plan view of four-wheel drive motor vehicle drive line incorporating the present invention.

Referring now to FIG. 1, a motor vehicle drive system incorporating the present invention is illustrated and generally designated by the reference number 10. The motor vehicle drive system 10 includes a prime mover, such as an internal combustion engine 12, which drives a conventional transmission 14 which may either be a manual transmission with a clutch or an automatic transmission. The output of the transmission 14 drives a transfer case assembly 16. In turn, the transfer case assembly 16 is operably coupled to and drives a rear or primary drive line 20 having a rear drive shaft 22 which is operably coupled to and drives a rear differential 24. The rear differential 24 drives a pair of aligned rear axles 26 which are coupled to a respective pair of rear tire and wheel assemblies 28.

The transfer case assembly 16 also provides torque to a front or secondary drive line 30. The front drive line 30 includes a front drive shaft 32 which in turn drives the front differential 34. The front differential 34 operates in conventional fashion and provides drive torque through a pair of aligned front axles 36. A pair of front tire and wheel assemblies 38 are disposed at the front of the vehicle. A pair of locking hubs 42 may be operably disposed between a respective one of the front pair of axles 36 and the associated front tire and wheel assembly 38. The locking hubs 42 may be either remotely operated and thus include electrical or pneumatic operators or may be manually activated.

Alternatively, the front tire and wheel assemblies 38 may be connected directly to respective ones of the front axles 36 and front axle disconnects (not illustrated) may be housed within the front differential 34 and the axle disconnects may be activated or deactivated to couple or uncouple the front axles 36 from the output of the front differential 34. As a further alternative, the locking hubs 42 or axle disconnects may be omitted such that the entire secondary drive line 30 is engaged and driven by the secondary output of the transfer case assembly 16 full time. Finally, both the rear drive line 20 and the front drive line 30 may include suitable and appropriately disposed universal joints 44 which function in conventional fashion to allow static and dynamic offsets and misalignments between the various shafts and components.

Figure 2:
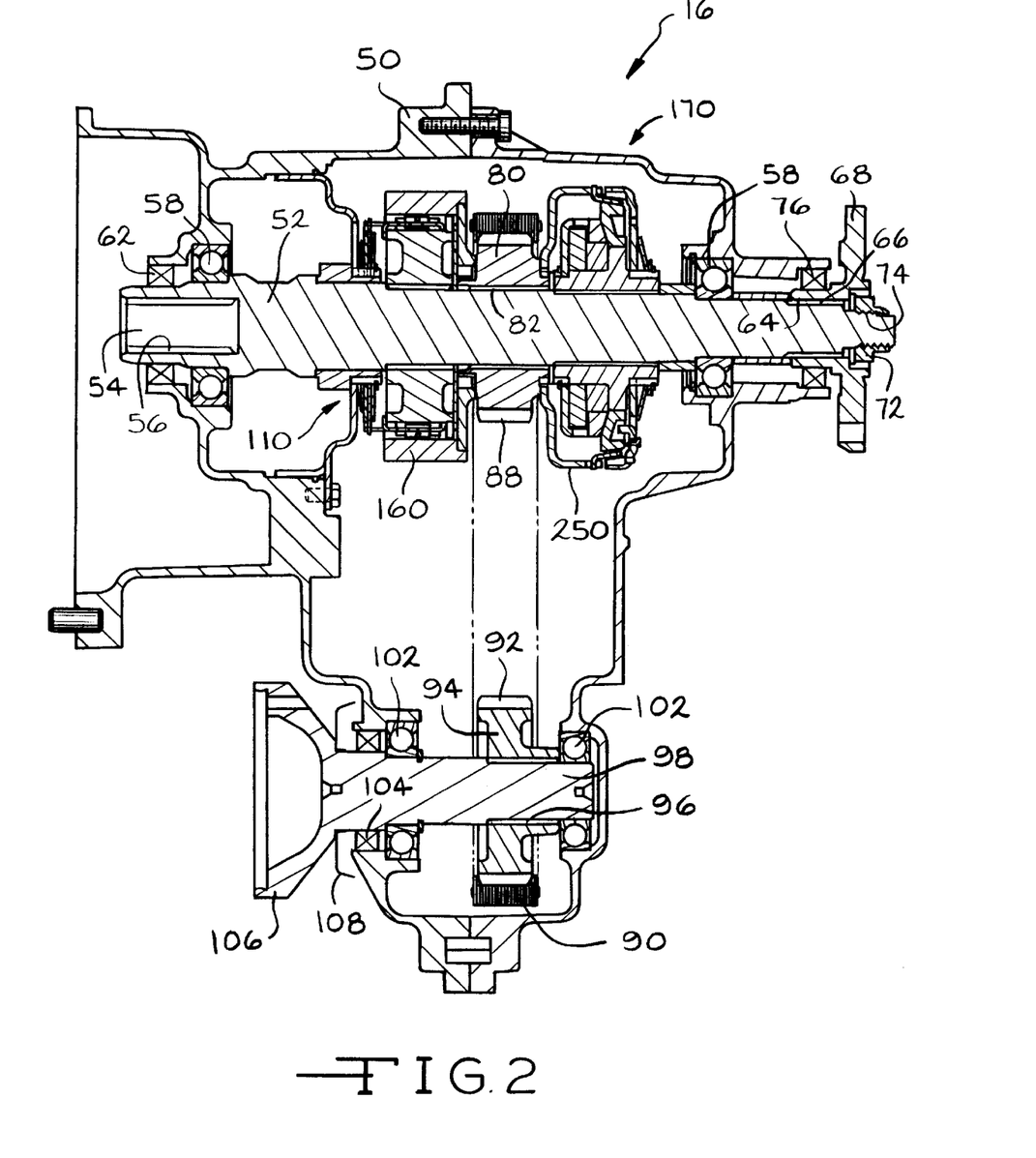
FIG. 2 is a full, sectional view of a preferred embodiment of a motor vehicle transfer case according to the present invention.

Referring now to FIGS. 1 and 2, the transfer case assembly 16 includes a multiple part, typically cast, housing 50 having various openings for shafts and fasteners, various locating grooves and mounting surfaces for internal components and other internal and external surfaces and features as will be readily appreciated. The transfer case assembly 16 also includes a main shaft 52 which extends from the front to the rear (from left to right as viewed in FIG. 2) in the housing 50 and includes a re-entrant bore 54 adjacent the front or input end of the main shaft 52 having female or internal splines 56 formed therein which engage complementarily configured male or external splines on an output shaft (not illustrated) of the vehicle transmission 14. The main shaft 52 is supported for free rotation by a pair of anti-friction assemblies such as ball bearing assemblies 58 disposed at the front and rear of the housing 50 of the transfer case assembly 16. Outwardly adjacent the front ball bearing assembly 58 is a suitable oil seal 62 which provides a suitable fluid tight seal between the main shaft 52 and the housing 50.

At the right or output end of the main shaft 52 are male or external splines 64 which mate with complementarily configured female or internal splines 66 on an output flange 68. The output flange 68 is preferably secured to the main shaft 52 by a threaded fastener such as a nut 72 received upon a complementarily threaded region 74 of the main shaft 52. The output flange 68 may be a portion of a universal joint such as the universal joint 44 or may be connected to or receive other drive line and power transmitting components (not illustrated). An oil seal 76 provides a suitable fluid tight seal between a portion of the flange 68 and the housing 50.

Figure 3:
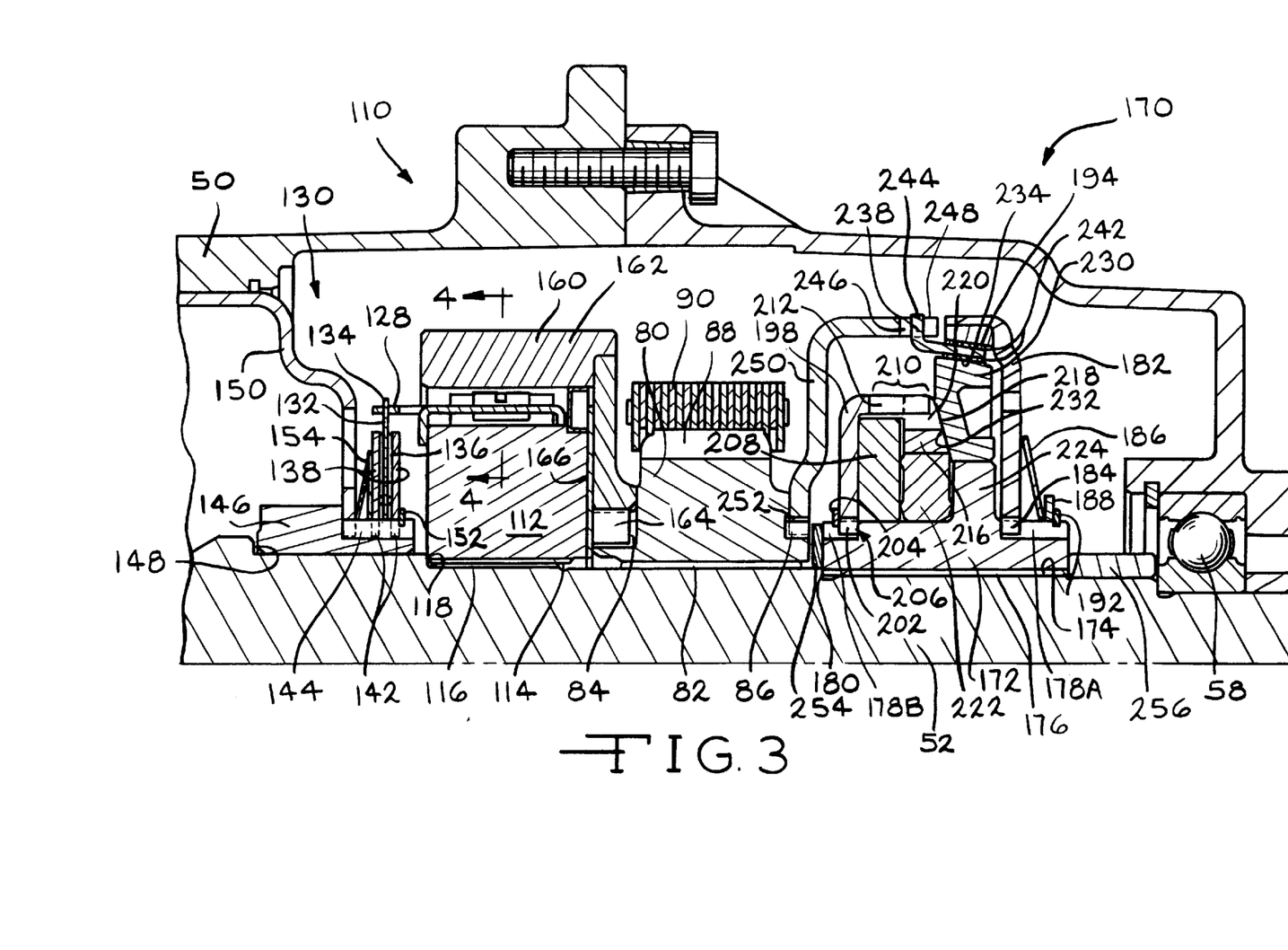
FIG. 3 is an enlarged, fragmentary, sectional view of the transfer case parallel clutch arrangement according to the preferred embodiment of the present invention.

Referring now to FIGS. 2 and 3, centrally and freely rotatably disposed upon the main shaft 52 is a chain drive sprocket 80. A friction reducing bearing 82 which may be either a journal bearing or an anti-friction roller or needle bearing rotatably supports the chain drive sprocket 80. The chain drive sprocket 80 includes first engageable structures 84 on its forward (left) face. The engageable structures 84 may be gear teeth, male splines, alternating projections and recesses or apertures. Similarly, on the rear (right) face of the chain drive sprocket 80 are disposed second engageable structures 86. The second engageable structures 86 may be either gear teeth, male splines, alternating projections and recesses or apertures. The chain drive sprocket 80 also includes chain drive teeth 88 which receive and drivingly engage a chain 90. The chain 90 circulates about the chain drive sprocket 80 and engages chain teeth 92 on a driven chain sprocket 94. The driven chain sprocket 94 includes a portion of an interengaging spline set 96 which positively rotationally couples the driven chain sprocket 94 to a secondary, stub output shaft 98. The stub output shaft 98 is supported for free rotation upon a pair of anti-friction bearings such as ball bearing assemblies 102. A suitable oil seal 104 provides an appropriate fluid tight seal between the stub shaft 98 and the housing 50. The stub shaft 98 terminates in a preferably integral flange 106 which may be a portion of one of the universal joints 44 or a similar drive line component. A circular shield 106 mounted on the stub output shaft 98 protects the oil seal 104.

Figure 4:
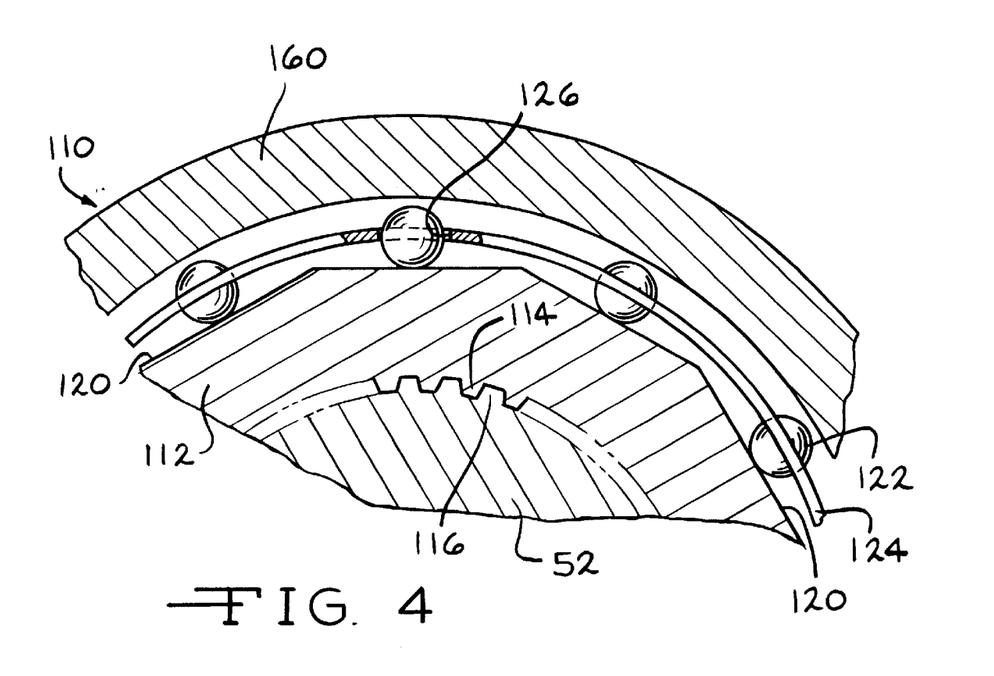
FIG. 4 is a fragmentary, sectional view of a double overrunning clutch assembly according to the present invention taken along line 4—4 of FIG. 3.

Referring now to FIGS. 2, 3 and 4, the transfer case assembly 16 includes a two-way or double overrunning clutch assembly 110. The double overrunning clutch assembly 110 includes a center drive member 112 having female or internal splines 114 which are drivingly engaged by male or external splines 116 on the main shaft 52. A first shoulder 118 on the main shaft 52 acts as a stop to axially position and restrain the center drive member 112. The peripheral surface of the center drive member 112 defines a plurality of planar, chordal surfaces 120. Associated with each of the chordal surfaces 120 and thus located at circumferentially spaced-apart locations about the center drive member 112 are a plurality of clutch rollers 122. A cylindrical cage 124 which is disposed concentrically and extends circumferentially about the center drive member 112 includes a plurality of axially extending slots 126 which each receive one of the plurality of clutch rollers 122. The cylindrical cage 124 thus maintains the positions and spacing of the rollers 122 and ensures that they operate in unison. A portion of the cylindrical cage 124 extends axially beyond the center drive member 112 and defines a plurality of alternating fingers or tabs and recesses 128.

A friction brake or drag assembly 130 is disposed adjacent the center drive member 112. The drag assembly 130 includes a center friction disc 132 having a plurality of radially extending fingers or tabs and recesses 134 which are complementary to the tabs and recesses 128 on the cylindrical cage 124. Thus, the center friction disc 132 rotates with the cylindrical cage 124. The center friction disc 132 includes suitable clutch or friction material 136 secured thereto and is disposed between a pair of outer friction discs 138. The outer friction discs 138 include female or internal splines 142 which mate with complementarily configured male or external splines 144 on a stationary collar 146. The stationary collar 146 is stabilized on the freely rotating main shaft 52 adjacent a second shoulder 148 which axially positions and restrains it. The stationary collar 146 is secured to a web or bracket 150 which, in turn, is attached to the housing 50. A snap ring 152 maintains the outer friction disc 138 disposed adjacent the double overrunning clutch assembly 110 in a fixed axial position on the stationary collar 146 and a Belleville spring or wave washer 154 biases the other outer friction disc 138 such that a preselected compressive force provides a desired drag to the center friction disc 132 and thus to the cylindrical cage 124. Such drag presets or pre-stages the cylindrical cage 124 depending upon the direction of rotation of the main shaft 52 and thus determines the reference directions of overrunning and lock-up of the double overrunning clutch assembly 110 as those familiar with such devices will appreciate.

The double overrunning clutch assembly 110 also includes a cylindrical output member 160 which is secured to or may be integrally formed with a circular end plate 162 having gear teeth, projections, lugs or other structures 164 which drivingly engage the engageable structures 84 on the chain drive sprocket 80. A flat washer 166 spaces and reduces friction between the drive member 112 and the circular end plate 162.

The double overrunning clutch assembly 110 provides a first power and torque path from the main drive shaft 52 to the chain drive sprocket 80 and the stub output shaft 98. Operation and torque transfer of the double overrunning clutch assembly 110 is conventional in that rotation of the main shaft 52 in one direction or the other presets or pre-stages the rollers 122 by virtue of the action of the drag 130. Subsequent to such presetting or pre-staging, the circular output member 160 is driven and rotates at least as fast as the center drive member 112. If the driven member 160 is then urged to overrun the main shaft 52, the double overrunning clutch assembly 110 releases and allows such overrunning.

The transfer case assembly 16 also includes a centrifugal cone clutch assembly 170. The centrifugal cone clutch assembly 170 includes a drive collar 172 having female or internal splines 174 which mate with complementarily configured male or external splines 176 on the main shaft 52. The drive collar 172 also includes sets of male or external splines 178A and 178B disposed proximate each of its ends. A third shoulder 180 on the main shaft 52 acts as a stop to axially position and restrain the drive collar 172. A circular drive member 182 having an L-shaped cross section includes female or internal splines 184 complementary to and engaged by the male splines 178A on the drive collar 172. A biasing device such as a Belleville spring or wave washer 186 is restrained on the male splines 178A adjacent the drive member 182 by a washer 188 and a snap ring 192. The Belleville spring or wave washer 186 biases the drive member 182 towards the left as illustrated in FIG. 3. The drive member 182 includes an internal frusto-conical friction clutch surface 194.

On the opposite end of the drive collar 172, engaging the male splines 178B, is a retaining member 198 having an L-shaped cross section and female or internal splines 202 which are complementary to and engage the male splines 178B. A snap ring 204 retains the retaining member 198 in position against a shoulder 206 formed in the drive collar 172. An annular spacer 208 is also received within the retaining member 198.

The retaining member 198 includes a plurality of recesses 210 defined by tabs or lugs 212. Each of the recesses 210 extends over preferably about 25 angular degrees and the lugs 212 preferably occupy about 5 angular degrees and thus preferably twelve recesses 210 and twelve lugs 212 occupy the circumference of the retaining member 198. Centered on each of the lugs 212 of the retaining member 198 and extending through the recesses 210 are a like plurality of first weights 216 having oblique surfaces 218 and centrally disposed slots 220 which receive the lugs 212. Preferably twelve first weights 216 are utilized although more or fewer may be suitable and utilized as appropriate. Located radially inwardly from each of the plurality of first weights 216 is a like plurality of second weights 222. The weights 216 and 222 are axially restrained by the spacer 208 and a flange 224 extending from the drive collar 172.

Adjacent the oblique surfaces 218 are a plurality of, preferably twelve, arcuate clutch segments 230. The clutch segments 230 each include an oblique arcuate surface 232 which faces the corresponding oblique surface 218 on one of the first weights 216. Each of the clutch segments 230 preferably extends over about 30 degrees and thus twelve of the clutch segments 230 are utilized. More or fewer of the clutch segments 230 may be utilized or appropriate. The outer surfaces of each of the clutch segments 232 define oblique friction surfaces 234. Positioned between the friction surfaces 194 and 234 is a frusto-conical clutch band or member 238. Disposed between each face of the frusto-conical clutch member 238 and adjacent the friction surfaces 194 and 234 and secured to either are curved segments or sections of friction material 242. The frusto-conical clutch member 238 includes a plurality of radially extending tabs or fingers 244 interrupted by recesses.

The tabs or fingers 244 are received within complementarily configured recesses 246 defined by lugs 248 in a bell shaped output member 250. The bell shaped output member 250 includes gear teeth, lugs, projections or splines 252 which are complementary to and thus engage and drive the engageable structures 86 on the chain drive sprocket 80. A flat washer 254 located between the chain drive sprocket 80 and the drive collar 172 separates these components and reduces friction therebetween. An annulus 256 disposed between the drive collar 172 and the adjacent ball bearing assembly 58 axially locates and restrains the drive collar 172 and thus the entire centrifugal cone clutch assembly 170.

Operation of the preferred embodiment centrifugal cone clutch assembly 170 will now be described. At the outset, it will be appreciated that the Belleville spring or wave washer 186 provides a preselected or threshold frictional coupling and thus minimum level of torque transfer through the centrifugal cone clutch assembly 170 due to the oblique orientation of the frusto-conical clutch member 238. Setting or adjustment of the minimum torque transfer through the centrifugal cone clutch assembly 170 can be adjusted by varying, for example, the spring rate, the extent of compression of the Belleville spring or wave washer 186 or the angle of the frusto-conical clutch member 238 as will be readily appreciated.

As the speed of rotation of the main shaft 52 increases, the weights 216 and 222 will move radially outwardly and, through forces acting along the oblique line of contact between the surfaces 218 and 232, move the clutch segments 230 outwardly and to the right, as viewed in FIG. 3, against the frusto-conical clutch member 238 and increase torque transfer through the centrifugal cone clutch assembly 170. As the clutch segments 230 continues to move, they will contact the inside surface of the drive member 182, cease outward movement and limit the torque throughput through the centrifugal cone clutch assembly 170. Thus, the torque throughput of the centrifugal cone clutch assembly 170 will reach a limit above which increasing rotational speed of the main shaft 52 will no longer increase torque throughput of the centrifugal cone clutch assembly 170.

Figure 8:
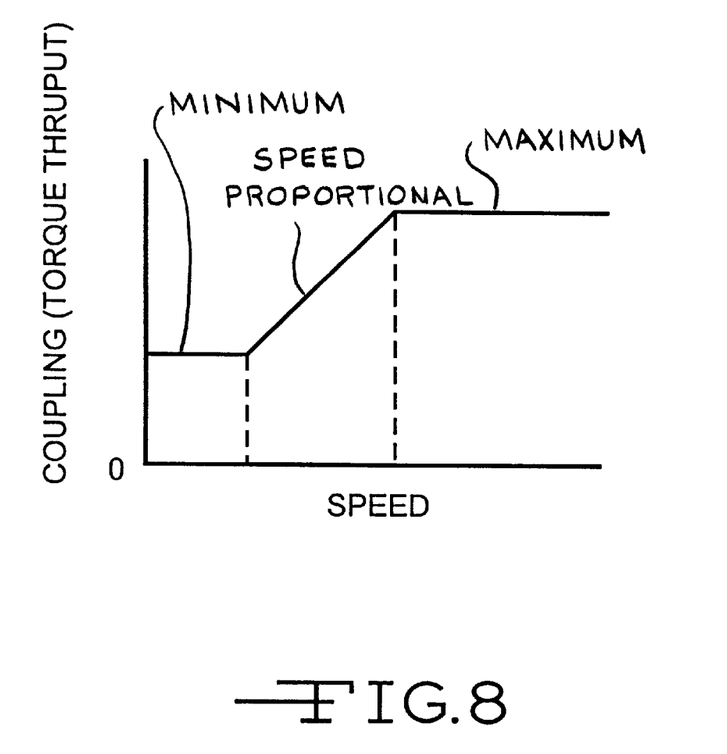
FIG. 8 is a graph showing the qualitative relationship between rotational speed and coupling, i.e., torque throughput, through a centrifugal clutch according to the present invention.

Regarding these operating features, reference to FIG. 8 is suggested. While the actual minimum and maximum torque throughputs will vary widely with various characteristics of associated motor vehicles, such as horsepower and torque output of the engine, vehicle weight and many other operational variables, a minimum torque throughput of between about 10 and 20 lbs.ft. and a maximum torque throughput of between about 30 to 70 lbs.ft. has been found suitable in many applications. It is anticipated, however, that these values may be altered by plus or minus 100% or more to provide optimum operation and handling characteristics in a given vehicle. Thus, the foregoing torque values are illustrative only and the invention should not be interpreted to be limited thereby.

The foregoing operation of the centrifugal cone clutch assembly 170 in the transfer case assembly 16 according to the present invention, of course, occurs in conjunction with the operation of the double overrunning clutch assembly 110. Since the double overrunning clutch assembly 110 is basically a binary or on-off device which either drives the secondary stub output shaft 98 at least as fast as the main shaft 52 or allows overrunning thereof, it is apparent that the centrifugal cone clutch assembly 170 contributes to transfer case operation, and specifically torque transfer, only when the overrunning clutch assembly 110 is overrunning or unlocked. That is, when the double overrunning clutch assembly 110 is in the locked or driving mode, the connection between the main shaft 52 and stub shaft 98 is direct or complete. However, when the double overrunning clutch assembly 110 is in its unlocked or overrunning mode because the stub shaft 98 and the secondary drive line 30 is overrunning the main shaft 52 and the primary drive line 20, the torque transfer characteristics discussed above and presented in FIG. 8 determine the torque transfer through the transfer case assembly 16.

Figure 5:
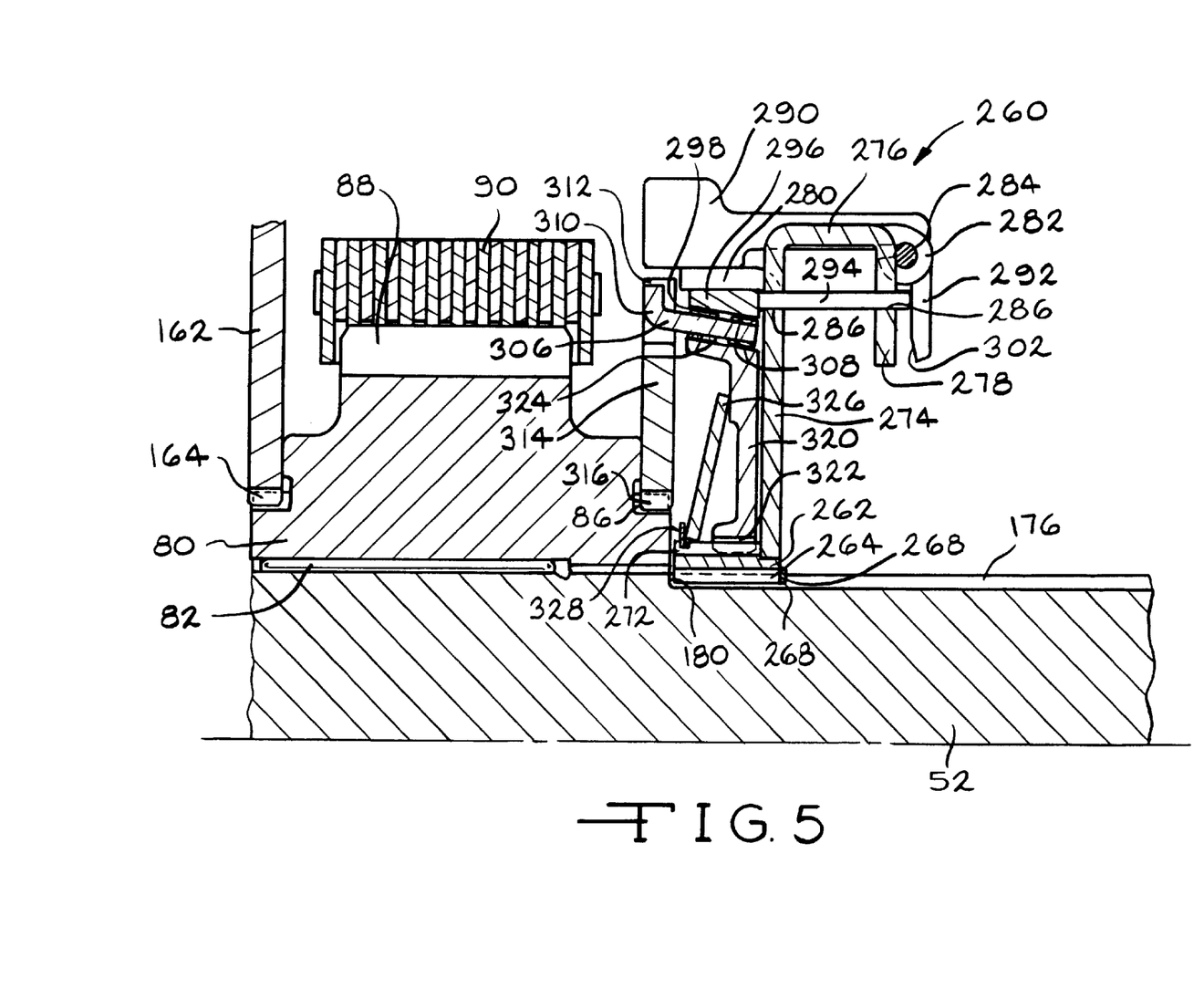
FIG. 5 is an enlarged, fragmentary, sectional view of a first alternate embodiment centrifugal clutch assembly according the present invention.

Referring now to FIG. 5, a first alternate embodiment centrifugal cone clutch assembly 260 is illustrated. The first alternate embodiment centrifugal clutch assembly 260 includes a drive collar 262 having female or internal splines 264 which are complementary to the male or external splines 176 on the main shaft 52. The drive collar 262 is axially restrained between the third shoulder 180 on the main shaft 52 and a snap ring 268 which seats within a circumferential groove formed in the male or external splines 176. The drive collar 262 includes a set of male or external splines 272 as well as a radially and circumferentially extending circular member 274 which is securely fastened to or integrally formed therewith and generally defines a J-shape in cross section. The circular member 274 includes axially extending portions 276 and a reverse flange 278. Portions of the reverse flange 278 are rolled or formed into circular members 282 which receive pivot pins 284. The circular member 274 also includes axial tongues 280 oriented oppositely to the axially extending portions 276. The circular members 274 and the reverse flange 278 define a plurality of aligned, through passageways 286 adjacent each of the pivot pins 284. The pivot pins 284 receive and pivotally support a plurality of weights 290 having integral, radially inwardly disposed lever arms 292. Preferably, twelve of the weights 290 are supported on a like plurality of pivot pins 284 both disposed concentrically about the main shaft 52. However, more or fewer weights 290 may be used if desired.

Generally aligned with the lever arms 292 are a like plurality of transfer arms 294 which are received within the axial passageways 286 and terminate in clutch shoes 296 having oblique surfaces 298. The clutch shoes 296 slide against and are radially restrained by the axial tongues 280. The lever arms 292 also include stops or contact surfaces 302 which, upon contact with the reverse flange 278 limit radial travel of the weights 290 and axial travel of the transfer arms 294.

A frusto-conical clutch band 306 includes clutch or friction material 308 secured to its inner and outer surfaces. The frusto-conical clutch band 306 includes a plurality of tabs or fingers 310 which are received within complementarily spaced apart recesses 312 formed in a circular plate 314. The circular plate 314 includes internal or female splines, gear teeth or lugs 316 which mate with the complementarily configured engageable structures 86 on the chain drive sprocket 80. A circular drive member 320 includes female or internal splines 322 which mate with the male or external splines 272 on the drive collar 262. The circular drive member 320 includes an oblique clutch face 324 which engages the friction material 308 on the inner face of the frusto-conical clutch band 306. A biasing device such as a Belleville spring or wave washer 326 biases the circular drive member 320 toward the circular member 274. A snap ring 328 retains the Belleville washer or wave spring 326 in position.

Operation of the first alternate embodiment centrifugal cone clutch assembly is very similar to the operation of the preferred embodiment cone clutch assembly 170. The Belleville spring or wave washer 326 provides a biasing force and, through selection of its spring rate, extent of compression and the angle of the frusto-conical clutch band 306, sets a minimum frictional coupling and thus torque throughput. As the main shaft rotates and increases speed, the weights 290 move radially outwardly, driving the transfer arms 294 to the left as illustrated in FIG. 5. This action increases the frictional coupling between the circular drive member 320 and the frusto-conical clutch band 306, increasing torque throughput through the centrifugal cone clutch assembly 260. As the weights 290 continue to move radially outwardly, the contact surfaces 302 engage the reverse flange 278 and inhibit further outward motion of the weights 290 thereby limiting torque transfer through the clutch assembly 260.

Figure 6:
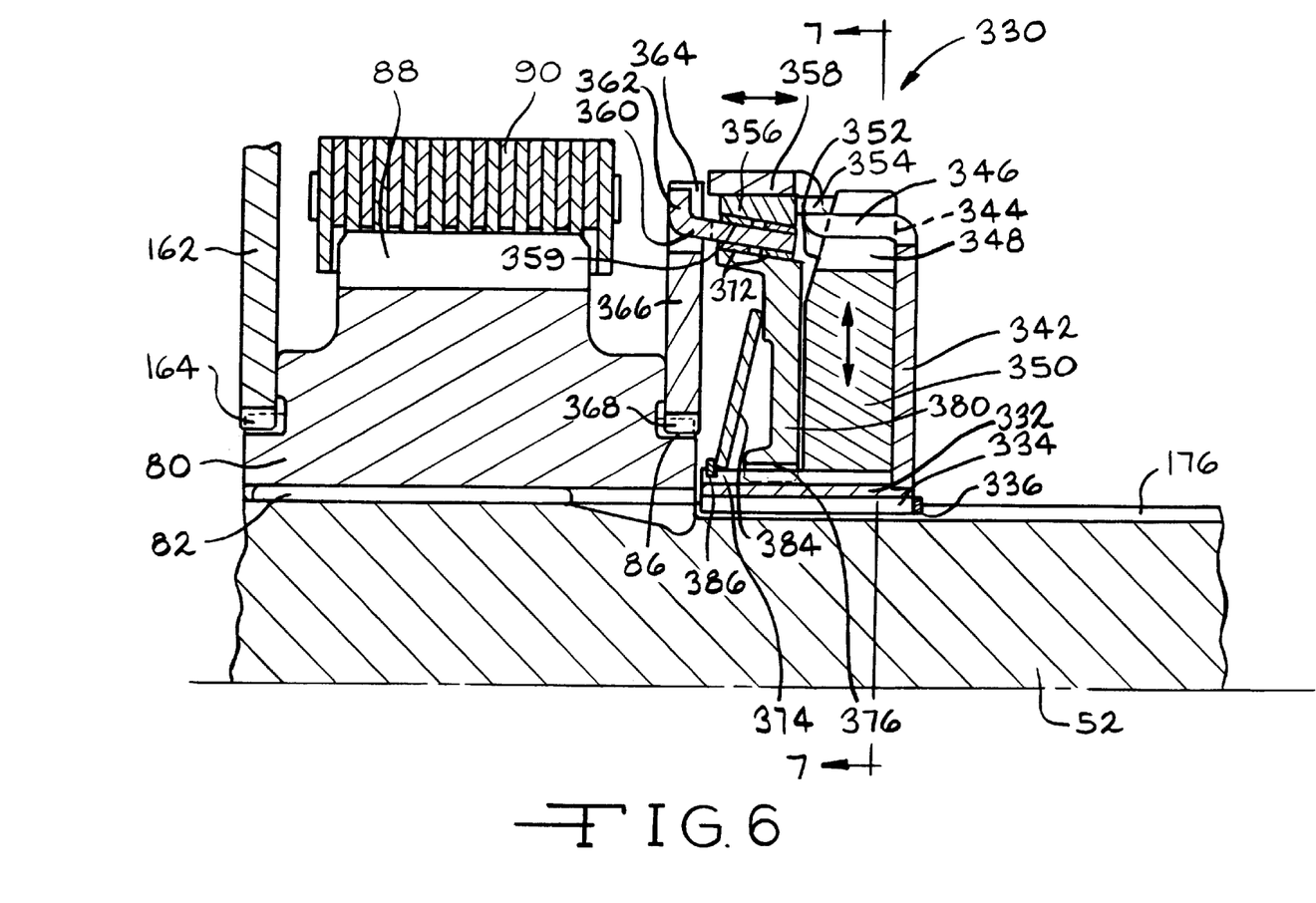
FIG. 6 is an enlarged, fragmentary, sectional view of a second alternate embodiment centrifugal clutch assembly according to the present invention.
Figure 7:
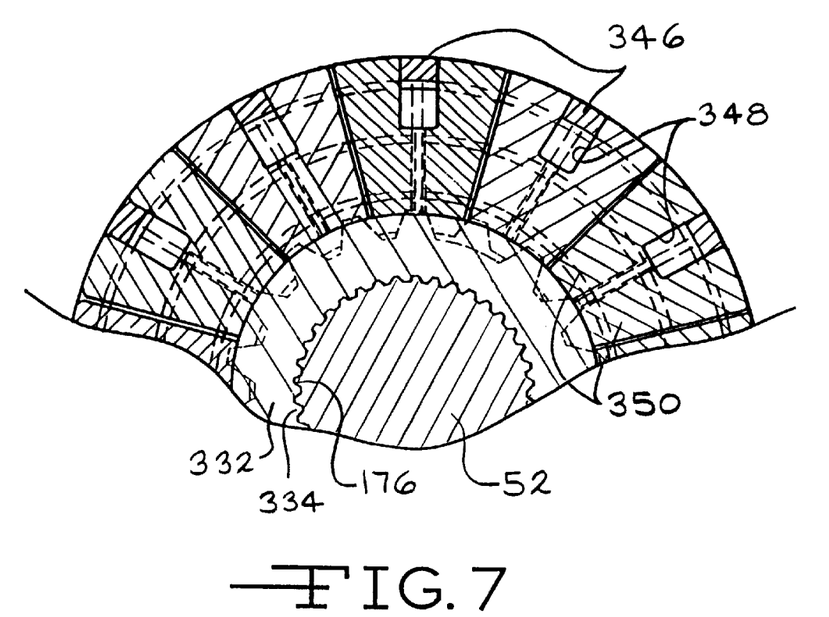
FIG. 7 is a fragmentary, sectional view of the second alternate embodiment centrifugal clutch assembly according to the present invention taken along line 7—7 of FIG. 6.

Referring now to FIGS. 6 and 7, a second alternate embodiment centrifugal clutch assembly 330 is illustrated. The second alternate embodiment centrifugal clutch assembly 330 includes a collar 332 having female or internal splines 334 which are complementary to the external splines or gear teeth 176 on the main shaft 52. The collar 332 is axially positioned between the chain drive sprocket 80 and a snap ring 336 which is seated in a circumferential groove in the male splines or gear teeth 176. The collar 332 includes a bell housing 342 which is either integrally formed with or positively secured to the collar 332. The bell housing 342 includes a plurality of circumferentially extending apertures 344 defined by axial members or struts 346. The struts 346 are engaged by radial slots 348 in a like plurality of weights 350. Preferably twelve weights 350 are utilized though more or fewer may also be utilized. The weights 350 include oblique faces 352 which are engaged by a like plurality of transfer arms 354 from a like plurality of clutch shoes 356. The clutch shoes 356 slide against and are generally radially restrained by an axially extending portion 358 of the bell housing 342. The clutch shoes 356 include frusto-conical friction surfaces 359.

A frusto-conical clutch band or member 360 includes a plurality of tabs or fingers 362 which are received within complementarily configured openings or recesses 364 in a radially disposed circular plate 366. The circular plate 366 includes female or internal splines, gear teeth or lugs 368 which mate with the engageable structures 86 on the chain drive sprocket 80.

On both faces of the frusto-conical clutch member 360 are disposed clutch or friction material 372. The collar 332 includes male or external splines 376 which drivingly engage female or internal splines 378 on a circular drive member 380. The drive member 380 includes a frusto-conical friction surface 382 which engages the friction material 372. A biasing device such as a Belleville spring or wave washer 384 is disposed adjacent the circular drive member 380 and biases it towards the weights 350 and the bell housing 342. A snap ring 386 axially restrains the Belleville spring or wave washer 384 and is received within a suitable groove in the splines 374.

Operation of the second alternate embodiment centrifugal clutch assembly 330 is quite similar to the foregoing operational descriptions, that is, the Belleville spring or wave washer 384 biases the drive member 380 to the right as illustrated in FIG. 6, thereby providing a minimum frictional coupling and torque throughput. Increasing rotational speed of the main shaft 52 translates the weights 350 radially outwardly and causes greater frictional coupling as the clutch shoes 356 move to the left as shown in FIG. 6. At a certain speed, the bottoms of the radial slots 348 contact the struts 346 and further radial motion is inhibited, thus limiting the force applied to the clutch band 360 and the torque throughput of the centrifugal clutch assembly 330.

Reference to FIG. 8 reveals the torque transfer characteristics of the centrifugal cone clutches of the preferred and alternate embodiments between the rear drive line and the front drive line in a four-wheel drive vehicle as a function of rotational speed of the main shaft 52. Such minimum and maximum torque transfer levels with intermediate torque transfer being dependent upon vehicle drive line speed improves vehicle handling, particularly in off throttle conditions wherein engine braking may cause the rear wheels to lose traction, particularly on low m$\mu$ surfaces. By limiting the maximum frictional coupling or torque transfer between the drive lines, binding of the four wheels at high speeds is also significantly reduced.

It should be appreciated that the speeds at which the centrifugal cone clutch assembly according to the preferred and alternate embodiments exceeds the minimum torque level and begins to provide proportional transfer as well as that speed at which proportional transfer ceases and the frictional coupling or torque transfer once again becomes fixed are selectable to match the performance characteristics of a given vehicle. This, too, improves overall vehicle handling and performance.

The foregoing disclosure is the best mode devised by the inventor for practicing this invention. It is apparent, however, that apparatus incorporating modifications and variations will be obvious to one skilled in the art of vehicle drive line components. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A power distribution device for vehicle drivelines comprising, in combination,
   a main drive member adapted to receive drive power,
   a second drive member,
   a two-way overrunning clutch operably disposed between said main drive member and said second drive member, and
   a centrifugal clutch operably disposed between said main drive member and said second drive member, said centrifugal clutch including a biasing device to provide minimum frictional coupling through said centrifugal clutch and stops to limit maximum frictional coupling through said centrifugal clutch.

2. The power distribution device of claim 1 wherein said second drive member is a chain drive sprocket and further including an output shaft, a driven chain sprocket disposed on said output shaft and a chain engaging said chain sprockets.

3. The power distribution device of claim 1 wherein said main drive member is a shaft.

4. The power distribution device of claim 13 wherein said centrifugal clutch includes a frusto-conical clutch band.

5. The power distribution device of claim 1 wherein said centrifugal clutch includes a frusto-conical clutch band, a plurality of weights operably coupled to a first plurality of clutch shoes and a clutch member operably coupled to said biasing device.

6. The power distribution device of claim 1 wherein said two-way overrunning clutch includes a plurality of circumferentially spaced apart rollers, a circular member having a plurality of circumferentially spaced apart cam surfaces engageable by said rollers, a cage for receiving said rollers and a drag assembly operably coupled to said cage.

7. The power distribution device of claim 1 wherein said two-way overrunning clutch and said centrifugal clutch are each concentrically disposed upon said main drive member.

8. The power distribution device of claim 1 further including a chain drive sprocket rotatably disposed upon said main drive member and interposed said two-way overrunning clutch and said centrifugal clutch.

9. A torque distribution device for a motor vehicle comprising, in combination,
   a first drive member adapted to receive and provide torque to a first driveline,
   a second drive member adapted to provide torque to a second driveline,
   a two-way overrunning clutch operably disposed between said first drive member and said second drive member, and
   a centrifugal clutch operably disposed between said first drive member and said second drive member, said centrifugal clutch having at least one spring to partially engage said centrifugal clutch and at least one stop for limiting engagement of said centrifugal clutch.

10. The torque distribution device of claim 9 wherein said second drive member is a chain drive sprocket and further including an output shaft, a driven chain sprocket disposed on said output shaft and a chain engaging said chain sprockets.

11. The power distribution device of claim 9 wherein said centrifugal clutch includes a frusto-conical clutch band.

12. The torque distribution device of claim 9 wherein said centrifugal clutch includes a frusto-conical clutch band, a plurality of weights operably coupled to a first plurality of clutch shoes and a clutch member operably coupled to said spring.

13. The torque distribution device of claim 9 wherein said two-way overrunning clutch includes a plurality of circumferentially spaced apart rollers and a circular member having a plurality of circumferentially spaced apart cam surfaces engageable by said rollers.

14. The torque distribution device of claim 9 wherein said two-way overrunning clutch includes a plurality of circumferentially spaced apart rollers, a circular member having a plurality of circumferentially spaced apart apertures and a brake assembly coupled to said circular member.

15. The torque distribution device of claim 9 wherein said overrunning clutch and said centrifugal clutch are concentrically disposed upon said first drive member.

16. A motor vehicle transfer case comprising, in combination, a housing, a main drive shaft supported for rotation within said housing, a chain drive sprocket rotatably disposed upon said main drive shaft, a secondary drive shaft supported for rotation within said housing, a driven chain sprocket coupled to said secondary drive shaft, a chain engaging said drive and said driven sprockets, a two-way overrunning clutch operably disposed between said main drive shaft and said chain drive sprocket, and a centrifugal clutch operably disposed between said main drive shaft and said chain drive sprocket, said centrifugal clutch including means providing a minimum torque throughput, a maximum torque throughput and torque throughput proportional to rotational speed between said minimum and said maximum torque throughputs.

17. The motor vehicle transfer case of claim 16 wherein said centrifugal clutch includes a frusto-conical clutch band.

18. The motor vehicle transfer case of claim 16 wherein said two-way overrunning clutch includes a plurality of circumferentially spaced apart rollers, a circular member having a plurality of circumferentially spaced apart apertures and a drag assembly coupled to said circular member.

19. The motor vehicle transfer case of claim 16 wherein said means providing a minimum torque throughput includes a biasing device providing a minimum level of engagement of said centrifugal clutch.

20. The motor vehicle transfer case of claim 16 wherein said means providing a maximum torque throughput and torque throughput proportional to rotational speed include a plurality of weights and at least one stop arranged to limit translation of said weights.

* * * * *